Patented Mar. 19, 1946

2,396,983

UNITED STATES PATENT OFFICE 2,396,983

PARASITICIDAL COMPOSITIONS

Edgar C. Britton, Gerald H. Coleman, and Karl David Gordon Clack, Midland, Mich., assignors to The Dow Chemical Company, Midland, Mich., a corporation of Michigan No Drawing. Application December 5, 1941, Serial No. 421,806

5 Claims. (Cl. 16—24)

The present invention is concerned with parasitical compositions comprising rotenone, derris, or other rotenone-containing plant extract as an active toxicant and adapted to be employed for the control of insects and mites. It is further directed to a method for solubilizing rotenone in petroleum distillate.

Rotenone, and extracts of derris, cube, timbo, and other rotenone-containing plant products have been found effective against a wide range of insect and mite pests. While these toxicants have been of considerable theoretical interest, their practical development has been restricted because of low solubility in cheap solvents as petroleum distillate and other oily non-aqueous carriers, such as linseed and fish oils, commonly employed in the preparation of parasiticidal sprays, dusts, etc.

Among the difficulties encountered in the use of rotenone-containing toxicants is the preparation of concentrates comprising petrolem distillates or adapted to be diluted therewith. It has been suggested to use such agents as dibutyl phthalate, carbon tetrachloride, methyl ethyl ketone, condensation products of aldehyde with naturally occurring phenol products such as cardanol, etc., for solubilizing rotenone, but these materials are not entirely satisfactory. In some instances the cost of the solubilizer is prohibitive. Again, such volatile solvents as carbon tetrachloride, methyl ethyl ketone, and the like are relatively impermanent in their action whereby compositions in which they are employed decompose by reason of vaporization of the solubilizer. Of the naturally occurring phenols and derivatives thereof heretofore employed, some have been found injurious to growing vegetation, corrosive to the skin of humans, and to have undesirable characteristics as regards odor and irritation to the mucous membrane. Ester products such as the phthalates are not particularly effective as solubilizers whereby large amounts are required which contribute nothing to the ultimate efficiency of the composition.

It is among the objects of the present invention to provide oil-soluble parasiticidal concentrates comprising rotenone and rotenone-containing extracts which will be miscible in all proportions with petroleum distillate and in which the solubilizing agent does not readily volatilize or otherwise become dissipated so as to reduce the miscibility of the concentrate. A further object contemplates the provision of such a composition which will not be objectionable as regards odor and irritation by reason of the solubilizer employed. An additional object resides in the provision of a rotenone-containing concentrate in which the solubilizer contributes to the parasiticidal effectiveness of parasiticidal compositions prepared therefrom. A further object is to provide a method for solubilizing rotenone and rotenone-containing plant extracts in petroleum distillate.

According to the present invention rotenone or rotenone-containing extracts are caused to dissolve in petroleum distillate in the presence of a secondary solvent or solubilizer consisting essentially of secondary-butyl-phenol. A preferred method of operation comprises mixing the rotenone product with the secondary-butyl-phenol to obtain oil-soluble concentrates miscible in all proportions with petroleum distillate, non-injurious to growing vegetation in the amounts required for parasiticidal control, and of increased parasiticidal effectiveness. It has been found that the amount of secondary-butyl-phenol required to accomplish the solubilizing of rotenone is substantially less than that required for many solubilizers heretofore employed and that in such composition the rotenone and secondary-butyl-phenol so supplement one another that the mixture exerts a toxicity against insect and mite pests which is much greater than the sum of the toxicities of the rotenone and phenol. The expression "consisting essentially" as applied to the secondary-butyl-phenol content of the solubilizers herein described, refers to phenol products comprising at least 50 per cent by weight of secondary-butyl-phenol.

In operating according to the invention, 1 part by weight of rotenone or rotenone-containing extract is dissolved in a minimum of from 5 to 20 parts by weight of secondary-butyl-phenol. The exact minimum amount of phenol employed depends upon whether pure rotenone or an extract is employed, and, if the latter, the composition of the extract. A further contributing factor is the nature of the secondary-butyl-phenol product.

The composition is conveniently prepared by warming the rotenone and phenol together. The resulting solution may be diluted with a suitable petroleum distillate in order to obtain concentrates containing any desired percentage of rotenone and adapted to be incorporated into dusts, dispersed in water to obtain spray compositions, or employed without further modification for parasite control. Where it is desired to control household insect pests and for certain agricultural uses, dilution of the rotenone-phenol product with petroleum distillate results in the formation of a finished spray product. In such instances, the amount of distillate employed is such as to provide the very low concentration of rotenone required for control of the pests concerned.

An alternate procedure for the preparation of distillate solutions comprises dissolving the required amount of secondary-butyl-phenol directly in the petroleum distillate and thereafter adding the rotenone or rotenone-containing extract to the mixture. The solvent action of the secondary-butyl-phenol-petroleum distillate solution is greatly improved over that of the unmodified distillate.

Representative of the finely-divided solids which may be employed as carriers for the petroleum solutions of rotenone and secondary-butyl-phenol in the preparation of dust compositions are diatomaceous earth, pyrophyllite, talc, wood flour, carbon, gypsum, and the like. Wetting and emulsifying agents which are suitable in preparing aqueous dispersions of the petroleum solution described above include sodium lauryl sulfate, soap, glyceryl oleate, sodium salts of sulfonated aromatic hydrocarbons, caseinates, etc. Where such emulsifiers are oil-soluble, they may be incorporated directly into the rotenone-phenol concentrate.

The secondary-butyl-phenols with which the invention is concerned as solubilizers and supplementary toxicants include 2-secondary-butyl-phenol, 3-secondary-butyl-phenol, and 4-secondary-butyl-phenol. Any one of these isomers alone or any mixture thereof may be employed to obtain compositions falling within the scope of the present invention. For example, 4-secondary-butyl-phenol melting at between 50° and 59° C. may conveniently be employed in mixture with the ortho and/or meta isomers. Similarly, other phenolic materials, such as 4-tertiary-butyl-phenol, para-cyclohexyl-phenol, etc., may be mixed with the secondary-butyl-phenols to obtain products of low melting point adapted to be employed in accordance with the teaching of the present invention.

The secondary-butyl-phenols and isomeric mixtures thereof are conveniently prepared by the reaction of butenes, or normal or secondary-butyl-halides or alcohols with phenol in the presence of acid activated bleaching earth, zinc chloride, or aluminum chloride. An alternate procedure yielding a mixture of ortho, meta, and para isomers comprises the hydrolysis of secondary-butyl-chloro-benzene. The mixed products obtained from either of the foregoing procedures boil at from approximately 110° C. to 150° C. at 25 mm. pressure.

Any suitable petroleum fraction may be employed in the preparation of either the concentrates or the ultimate spray or dust compositions. Thus, materials of either paraffinic or naphthenic origin varying in physical properties from a light kerosene to a heavy lubricating oil are suitable. In the following examples the white oil employed was of paraffinic origin, had a specific gravity of 0.850 at 60°/60° F., an unsulfonatable residue of 96 according to the California method, a Saybolt viscosity of 81 seconds at 100° F., and a boiling range of 410° to 738° F. The kerosene employed was that commercially available as Deo-base oil having a specific gravity of 0.785 at 60°/60° F., an unsulfonatable residue of 97.5 according to the Whiting method, a Saybolt viscosity of 29.5 seconds at 100° F., and a boiling range of 410° to 445° C. These examples are not to be construed as limiting.

Example 1

A mixture of 2- and 4-secondary-butyl-phenols boiling at 120° to 132° C. at 18 mm. pressure and having a freezing point of 34.6° C. was employed as a solubilizer and supplementary toxicant for chemically pure rotenone. In this operation 0.05 gram of rotenone was dissolved in 2.5 grams of the secondary-butyl-phenol mixture. The resulting solution was diluted with 100 milliliters of Deo-base oil and employed as a fly spray for the control of 5-day-old houseflies according to the well-known Peet-Grady method. The spray composition gave a knockdown of 94 per cent in 10 minutes and a kill of 61.7 per cent in 72 hours. A comparable composition comprising 0.05 gram of rotenone solubilized by 2.5 milliliters of methyl ethyl ketone per 100 milliliters of Deo-base oil gave a knockdown of 75.2 per cent and a kill of 36.8 per cent in 72 hours. A control composition comprising 2.5 grams of the secondary-butyl-phenol fraction in 100 milliliters of the petroleum distillate gave a knockdown of 42.7 per cent and a kill of 2.1 per cent in 72 hours.

A mixture of ortho-, meta-, and para-secondary-butyl-phenols comprising 68 per cent of the meta-isomer and boiling at 136° C. at 25 mm. pressure was obtained as a product of the hydrolysis of secondary-butyl-chloro-benzene. A combination of 2.5 grams of this mixture with 0.05 gram of rotenone in 100 milliliters of petroleum distillate gave a knockdown of 99 per cent in 10 minutes and a kill of 79 per cent in 72 hours, when tested according to the Peet-Grady method. An analogous composition in which the rotenone was omitted gave a knockdown of 75 per cent in 10 minutes and a kill of 30 per cent in 72 hours.

Similarly, a mixture of para-secondary-butyl-phenol and para-tertiary-butyl-phenol boiling at approximately 132° C. at 20 mm. pressure was compounded with rotenone and petroleum distillate as described in the foregoing paragraphs. The resulting spray composition gave a knockdown against 5-day-old houseflies of 78 per cent in 10 minutes and a kill of 57 per cent in 72 hours. The phenol mixture alone in the amount of 2.5 grams per 100 milliliters of solution gave a knockdown of 88 per cent in 10 minutes and a kill of 13 per cent in 72 hours.

Example 2

In a series of determinations to ascertain the comparative amounts of solubilizers required to maintain rotenone in solution in kerosene, 1 part by weight of derris resin containing 33 per cent rotenone was employed in combination with from 5 to 15 parts by weight of several phenols and phenol mixtures. The derris resin was dissolved in the solubilizer to obtain a concentrate which was thereafter diluted with sufficient Deo-base oil to give 100 parts of solution. Each composition was then allowed to stand at room temperature and observed from time to time to ascertain its stability and degree of homogeneity. A solution containing the mixed secondary-butyl-phenol fraction (68 per cent meta-isomer) was found to become slightly cloudy when the concentration of solubilizer was reduced to 5 per cent by weight. A composition comprising 7.5 per cent remained clear. With the mixture of 2- and 4-secondary-butyl phenols there was a tendency for the solution to become hazy at 7.5 per cent of solubilizer. A similar result was obtained with 2-secondary-butyl-phenol. With a mixture of 4-secondary-butyl-phenol and 4-tertiary-butyl-phenols as described in Example 1, the critical concentration appeared to fall between 5 and 7.5 per cent. A similar result was obtained with a solubilizer consisting of equimolecular proportions of 4-tertiary-butyl- phenol and the mixed secondary-butyl-phenol comprising 68 per cent of the meta-isomer.

Example 3

The secondary-butyl-phenols were employed in combination with derris resin comprising 33 per cent rotenone to solubilize the latter in the refined white oil as previously described. This oil was much heavier than the oils employed in Examples 1 and 2 and in composition with certain known stabilizers offered considerable resistance to emulsification with water in the presence of sodium lauryl sulfate. Several compositions were prepared containing 0.5 per cent by weight of derris resin, 10 per cent of secondary-butyl-phenol solubilizer, and 89.5 per cent of oil. The particular solubilizers employed were 2-secondary-butyl-phenol, the mixed secondary-butyl-phenol product containing 68 per cent of meta isomer, and the mixture of 4-tertiary-butyl-phenol and 4-secondary-butyl-phenol. The compositions as prepared from each of these solubilizing products were allowed to stand for 2 weeks at room temperature. No precipitation or cloudiness developed in the solutions.

The foregoing mixtures were emulsified with water in the amount of 8 pounds of concentrate per 100 gallons finished composition. 8 ounces of sodium lauryl sulfate per 100 gallons was employed as emulsification agent. These aqueous emulsion compositions were applied in the field to soya bean foliage. No injury attributable to the spray application was observed.

Example 4

The rotenone-oil compositions described in Example 3 were emulsified with water in amount to yield a spray material comprising 2 pounds of the rotenone-oil per 100 gallons. The resulting aqueous emulsions, comprising 4 ounces of sodium lauryl sulfate per 100 gallons, were employed for the control of Mexican bean beetle. The composition containing the mixed secondary-butyl-phenol (68 per cent meta isomer) in combination with rotenone and that containing the mixture of 4-tertiary-butyl and 4-secondary-butyl-phenols gave 100 per cent control of the parasite. The composition containing the mixture of 2- and 4-secondary-butyl-phenols gave a kill of 90 per cent.

In a similar manner the compositions set forth in the preceding examples may be employed for the control of such representative insect and mite pests as thrips, aphids, red spider, Colorado potato beetle, and scales. Instead of employing the petroleum distillate solution of rotenone and secondary-butyl-phenol as a constituent of an aqueous emulsion, such solution may be applied directly, e. g., as by atomizing, to the insect or mite infested plants. Similarly, dispersions of the oily solutions on such carriers as walnut shell flour, diatomaceous earth and talc may be used in dusting operations as in the control of pea aphis, etc.

We claim:

1. A method for preparing petroleum distillate solutions of rotenone and rotenone-containing extracts comprising the step of contacting the rotenone product with the petroleum distillate in the presence of a solubilizer consisting essentially of secondary-butyl-phenol.

2. A method for preparing petroleum distillate solutions of rotenone and rotenone-containing extracts comprising the steps of dissolving the rotenone product in a solubilizer consisting essentially of secondary-butyl-phenol and dissolving the solution so obtained in petroleum distillate.

3. An insecticidal composition comprising a petroleum distillate solution of a secondary-butyl-phenol and a member of the class consisting of rotenone and rotenone-containing extracts, the secondary-butyl-phenol being present in sufficient quantity to maintain the rotenone toxicant in solution in the distillate.

4. An aqueous dispersion comprising as an active toxic ingredient a petroleum distillate solution of secondary-butyl-phenol and a member of the class consisting of rotenone and rotenone-containing extracts, the secondary-butyl-phenol being present in sufficient quantity to maintain the rotenone toxicant in solution in the distillate.

5. An insecticidal concentrate comprising a solution of a member of the class consisting of rotenone and rotenone-containing extracts in secondary-butyl-phenol and characterized by being miscible in all proportions with petroleum distillates.

EDGAR C. BRITTON.
GERALD H. COLEMAN.
KARL DAVID GORDON CLACK.